(12) United States Patent
Schwaegerl et al.

(10) Patent No.: US 10,058,930 B2
(45) Date of Patent: Aug. 28, 2018

(54) TOOL HEAD FOR ROTARY CUTTING TOOL AND ROTARY CUTTING TOOL INCLUDING SAME

(71) Applicant: Kennametal Inc., Latrobe, PA (US)

(72) Inventors: Juergen Schwaegerl, Vohenstrauss (DE); Berthold Heinrich Zeug, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 17 days.

(21) Appl. No.: 14/243,350

(22) Filed: Apr. 2, 2014

(65) Prior Publication Data

US 2014/0301799 A1    Oct. 9, 2014

(30) Foreign Application Priority Data

Apr. 3, 2013  (DE) .................. 10 2013 205 889

(51) Int. Cl.
  *B23B 51/02*   (2006.01)
(52) U.S. Cl.
  CPC .......... *B23B 51/02* (2013.01); *B23B 2240/04* (2013.01); *B23B 2251/02* (2013.01); *Y10T 408/9098* (2015.01); *Y10T 408/95* (2015.01)
(58) Field of Classification Search
  CPC . B23B 2240/04; B23B 2251/02; B23B 51/02; Y10T 408/9098
  See application file for complete search history.

(56) References Cited

U.S. PATENT DOCUMENTS

| 22,394 | A | 12/1858 | White |
| 40,297 | A | 10/1863 | Wakefield |
| 44,915 | A | 11/1864 | Baker |
| 273,388 | A | 3/1883 | Peatt |
| 329,660 | A | 11/1885 | Lord |
| 658,216 | A | 9/1900 | Munger |

(Continued)

FOREIGN PATENT DOCUMENTS

| AT | 9431 B | 10/1902 |
| CN | 1160370 A | 9/1997 |

(Continued)

OTHER PUBLICATIONS

Sep. 6, 2017 Final Office Action.

(Continued)

*Primary Examiner* — Daniel Howell
(74) *Attorney, Agent, or Firm* — Ian K. Samways

(57) ABSTRACT

The coupling part, in particular cutting head for a drilling tool for the interchangeable fastening in a coupling receptacle, has a coupling pin which is enclosed by a head support surface, wherein the coupling pin has a plurality of types of functional surfaces, namely stop surfaces for transmitting a torque between the cutting head and the carrier, and clamping surfaces for centering and clamping the cutting head in the coupling receptacle. The coupling pin has an axially front pin region and an adjoining, axially rear pin region, and the clamping surfaces and the stop surfaces are arranged in different pin regions. This decoupling and distribution of the functional surfaces to the various pin regions permits simpler production of the coupling pin and an overall more robust configuration.

21 Claims, 8 Drawing Sheets

(56) References Cited

U.S. PATENT DOCUMENTS

Figure 1A:
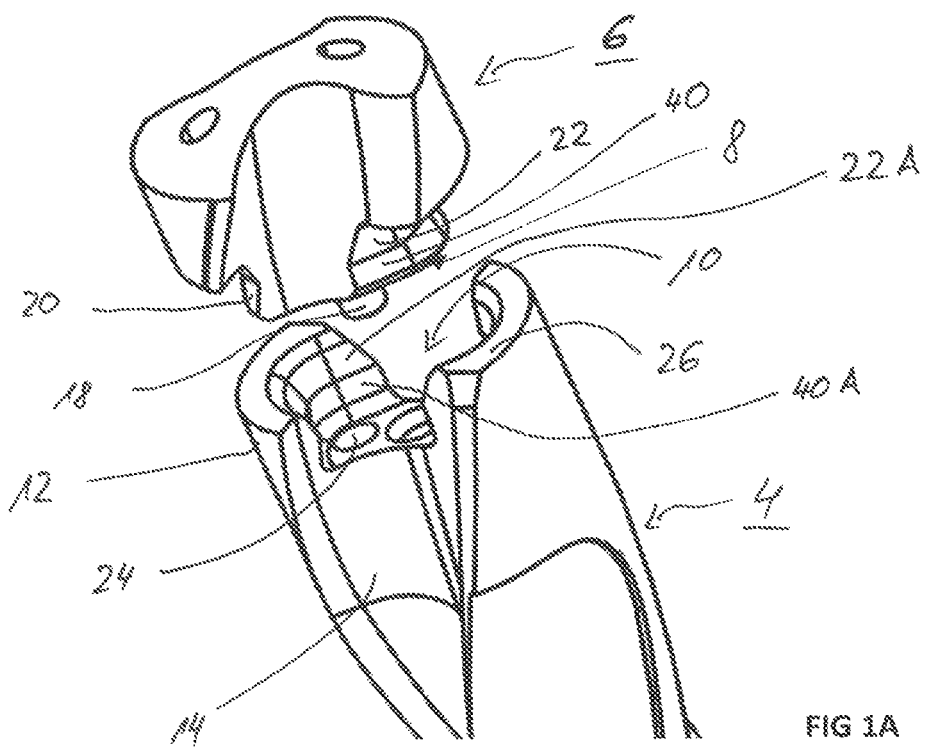

| | | |
|---|---|---|
| 690,093 A | 12/1901 | Beach |
| 756,339 A | 4/1904 | Down |
| 932,071 A | 8/1909 | Urbscheit |
| 1,461,548 A | 7/1923 | West |
| 2,158,120 A | 5/1939 | Hirschberg |
| 2,289,583 A | 7/1942 | Malone |
| 2,294,969 A | 9/1942 | Engvall |
| 3,140,749 A | 7/1964 | Dionisotti |
| 3,153,366 A | 10/1964 | Dearborn |
| 3,293,727 A | 12/1966 | Simms |
| 3,359,837 A | 12/1967 | Andreeasson |
| 3,410,749 A | 11/1968 | Chmiel |
| 3,434,553 A | 3/1969 | Weller |
| 3,548,688 A | 12/1970 | Kuch |
| 3,765,496 A | 10/1973 | Flores |
| 4,293,253 A | 10/1981 | Ott |
| D262,219 S | 12/1981 | Lassiter |
| D263,598 S | 3/1982 | Lassiter |
| D273,387 S | 4/1984 | Lassiter |
| D273,388 S | 4/1984 | Lassiter |
| D273,389 S | 4/1984 | Lassiter |
| D273,390 S | 4/1984 | Lassiter |
| D273,391 S | 4/1984 | Lassiter |
| D273,682 S | 5/1984 | Lassiter |
| D274,436 S | 6/1984 | Lassiter |
| 4,561,812 A | 12/1985 | Linden |
| 4,744,704 A | 5/1988 | Galvefors |
| 4,844,643 A | 7/1989 | Icks |
| 5,024,563 A | 6/1991 | Randall |
| 5,114,286 A | 5/1992 | Calkins |
| 5,154,549 A | 10/1992 | Isobe |
| 5,154,550 A | 10/1992 | Isobe |
| 5,228,812 A | 7/1993 | Noguchi |
| 5,346,335 A | 9/1994 | Harpaz |
| 5,429,199 A | 7/1995 | Sheirer |
| 5,452,971 A | 9/1995 | Nevills |
| 5,509,761 A | 4/1996 | Grossman |
| 5,634,747 A | 6/1997 | Tukala |
| 5,649,794 A | 7/1997 | Kress |
| 5,685,671 A | 11/1997 | Packer |
| 5,769,577 A | 6/1998 | Boddy |
| 5,791,838 A | 8/1998 | Hamilton |
| 5,863,162 A | 1/1999 | Karlsson |
| 5,901,455 A | 5/1999 | Krenzer |
| 5,904,455 A | 5/1999 | Krenzer |
| 5,957,631 A | 9/1999 | Hecht |
| 5,971,673 A | 10/1999 | Berglund |
| 5,980,166 A | 11/1999 | Ogura |
| 5,988,953 A | 11/1999 | Berglund |
| 5,996,714 A | 12/1999 | Massa |
| 6,000,000 A | 12/1999 | Hawkins |
| 6,012,881 A | 1/2000 | Scheer |
| 6,045,301 A | 4/2000 | Kammermeier |
| 6,059,492 A | 5/2000 | Hecht |
| 6,071,045 A | 6/2000 | Janness |
| 6,109,841 A | 8/2000 | Johne |
| 6,123,488 A | 9/2000 | Kasperik |
| 6,276,879 B1 | 8/2001 | Hecht |
| 6,447,218 B1 | 9/2002 | Lagerberg |
| 6,481,938 B2 | 11/2002 | Widin |
| 6,485,235 B1 | 11/2002 | Mast |
| 6,506,003 B1 | 1/2003 | Erickson |
| 6,514,019 B1 * | 2/2003 | Schulz ............... B23B 51/0009 408/227 |
| 6,524,034 B2 | 2/2003 | Eng et al. |
| 6,530,728 B2 | 3/2003 | Eriksson |
| 6,582,164 B1 | 6/2003 | McCormick |
| 6,595,305 B1 | 7/2003 | Dunn |
| 6,595,727 B2 | 7/2003 | Arvidsson |
| 6,626,614 B2 | 9/2003 | Nakamura |
| 6,648,561 B2 | 11/2003 | Kraemer |
| 6,840,717 B2 | 1/2005 | Eriksson |
| 7,008,150 B2 | 3/2006 | Krenzer |
| 7,048,480 B2 | 5/2006 | Borschert |
| 7,070,367 B2 | 7/2006 | Krenzer |
| 7,114,892 B2 * | 10/2006 | Hansson ............... B23B 51/02 408/226 |
| 7,125,207 B2 | 10/2006 | Craig |
| 7,134,816 B2 | 11/2006 | Brink |
| 7,189,437 B2 | 3/2007 | Kidd |
| 7,237,985 B2 | 7/2007 | Leuze |
| 7,306,410 B2 | 12/2007 | Borschert |
| 7,309,196 B2 | 12/2007 | Ruy Frota de Souza |
| 7,311,480 B2 | 12/2007 | Heule |
| 7,360,974 B2 | 4/2008 | Borschert |
| 7,377,730 B2 | 5/2008 | Hecht |
| 7,407,350 B2 | 8/2008 | Hecht |
| 7,431,543 B2 | 10/2008 | Bueftiker |
| 7,467,915 B2 | 12/2008 | de Souza |
| 7,559,382 B2 | 7/2009 | Koch |
| 7,591,617 B2 | 9/2009 | Borschert |
| D607,024 S | 12/2009 | Dost |
| 7,625,161 B1 | 12/2009 | de Souza |
| 7,677,842 B2 | 3/2010 | Park |
| 7,740,472 B2 | 6/2010 | Delamarche |
| 7,775,751 B2 | 8/2010 | Hecht |
| 7,832,967 B2 | 11/2010 | Borschert |
| D632,320 S | 2/2011 | Chen |
| D633,534 S | 3/2011 | Chen |
| 7,972,094 B2 | 7/2011 | Men |
| RE42,644 E | 8/2011 | Mats |
| 7,997,832 B2 | 8/2011 | Prichard |
| 8,007,208 B2 | 8/2011 | Noureddine |
| 8,021,088 B2 | 9/2011 | Hecht |
| 8,142,116 B2 | 3/2012 | Frejd |
| D668,697 S | 10/2012 | Hsu |
| D669,923 S | 10/2012 | Watson |
| 8,366,358 B2 | 2/2013 | Borschert |
| 8,376,669 B2 | 2/2013 | Jaeger |
| 8,430,609 B2 | 4/2013 | Frejd |
| 8,449,227 B2 | 5/2013 | Danielsson |
| 8,534,966 B2 | 9/2013 | Hecht |
| 8,556,552 B2 | 10/2013 | Hecht |
| 8,596,935 B2 | 12/2013 | Fang |
| 8,678,722 B2 | 3/2014 | Aare |
| 8,678,723 B2 | 3/2014 | Osawa |
| 8,721,235 B2 | 5/2014 | Kretzschmann |
| D708,034 S | 7/2014 | Huang |
| 8,784,018 B2 * | 7/2014 | Päbel ............... B23B 51/02 408/230 |
| 8,784,019 B2 | 7/2014 | Pabel |
| D711,719 S | 8/2014 | DeBaker |
| 8,807,888 B2 | 8/2014 | Borschert |
| 8,882,413 B2 | 11/2014 | Hecht |
| 8,931,982 B2 | 1/2015 | Osawa |
| 8,992,142 B2 | 3/2015 | Hecht |
| 9,028,180 B2 | 5/2015 | Hecht |
| 9,050,659 B2 * | 6/2015 | Schwaegerl ............ B23B 51/02 |
| 9,073,128 B2 | 7/2015 | Mack |
| 9,079,255 B2 | 7/2015 | Jager |
| 9,162,295 B2 | 10/2015 | Pabel et al. |
| D742,714 S | 11/2015 | King, Jr. |
| D742,948 S | 11/2015 | Kenno |
| 9,180,650 B2 | 11/2015 | Fang |
| 9,205,498 B2 | 12/2015 | Jaeger |
| 9,248,512 B2 | 2/2016 | Aare |
| 9,296,049 B2 | 3/2016 | Schwaegerl |
| 9,302,332 B2 | 4/2016 | Scanlon |
| 9,371,701 B2 | 6/2016 | Cox |
| 9,481,040 B2 | 11/2016 | Schwaegerl |
| 9,498,829 B2 | 11/2016 | Zabrosky |
| D798,921 S | 10/2017 | Frota De Souza Filho |
| D798,922 S | 10/2017 | Frota De Souza Filho |
| 2001/0033780 A1 | 10/2001 | Berglund |
| 2002/159851 A1 | 10/2002 | Krenzer |
| 2002/0168239 A1 | 11/2002 | Mast |
| 2002/0195279 A1 | 12/2002 | Bise |
| 2003/0039523 A1 | 2/2003 | Kemmer |
| 2003/0091402 A1 | 5/2003 | Lindblom |
| 2004/0240949 A1 | 12/2004 | Pachao-Morbitzer |
| 2005/0084352 A1 | 4/2005 | Borschert |
| 2005/0135888 A1 | 6/2005 | Stokey |
| 2006/0072976 A1 | 4/2006 | Frota de Souza |
| 2006/0093449 A1 | 5/2006 | Hecht |

(56) References Cited

U.S. PATENT DOCUMENTS

| | | |
|---|---|---|
| 2008/0003072 A1 | 1/2008 | Kim |
| 2008/0175676 A1 | 7/2008 | Prichard |
| 2008/0175677 A1 | 7/2008 | Prichard |
| 2008/0181741 A1 | 7/2008 | Borschert |
| 2008/0193231 A1 | 8/2008 | Jonsson |
| 2008/0193237 A1 | 8/2008 | Men |
| 2009/0044986 A1 | 2/2009 | Jaeger |
| 2009/0067942 A1 | 3/2009 | Tanaka |
| 2009/0071723 A1 | 3/2009 | Mergenthaler |
| 2009/0116920 A1 | 5/2009 | Bae |
| 2009/0123244 A1 | 5/2009 | Buettiker |
| 2009/0311060 A1 | 12/2009 | Frejd |
| 2010/0021253 A1 | 1/2010 | Frejd |
| 2010/0092259 A1 | 4/2010 | Borschert |
| 2010/0143059 A1 | 6/2010 | Hecht |
| 2010/0247255 A1 | 9/2010 | Nitzsche |
| 2010/0266357 A1 | 10/2010 | Kretzschmann |
| 2010/0272529 A1 | 10/2010 | Rozzi |
| 2010/0307837 A1 | 12/2010 | King |
| 2010/0322723 A1 | 12/2010 | Danielsson |
| 2010/0322728 A1* | 12/2010 | Aare ................ B23B 51/02 408/200 |
| 2010/0322729 A1* | 12/2010 | Pabel ................ B23B 51/02 408/200 |
| 2010/0322731 A1 | 12/2010 | Aare |
| 2011/0020072 A1 | 1/2011 | Chen |
| 2011/0020073 A1 | 1/2011 | Chen |
| 2011/0020077 A1 | 1/2011 | Fouquer |
| 2011/0020086 A1 | 1/2011 | Borschert |
| 2011/0027021 A1 | 2/2011 | Nelson |
| 2011/0081212 A1 | 4/2011 | Spichtinger |
| 2011/0097168 A1 | 4/2011 | Jager |
| 2011/0110735 A1 | 5/2011 | Klettenheimer |
| 2011/0110739 A1 | 5/2011 | Frisendahl |
| 2011/0168453 A1 | 7/2011 | Kersten |
| 2011/0229277 A1 | 9/2011 | Hoffer |
| 2011/0236145 A1 | 9/2011 | Päbel |
| 2011/0299944 A1 | 12/2011 | HÃ¶fermann |
| 2011/0318128 A1 | 12/2011 | Schwagerl |
| 2012/0003056 A1 | 1/2012 | Jaeger |
| 2012/0014760 A1 | 1/2012 | Glimpel |
| 2012/0082518 A1 | 4/2012 | Woodruff |
| 2012/0087746 A1 | 4/2012 | Fang |
| 2012/0087747 A1 | 4/2012 | Fang |
| 2012/0099937 A1 | 4/2012 | Osawa |
| 2012/0121347 A1 | 5/2012 | Osawa |
| 2012/0308319 A1 | 12/2012 | Sampath |
| 2012/0315101 A1 | 12/2012 | Osawa |
| 2013/0183107 A1 | 7/2013 | Fang |
| 2013/0183112 A1* | 7/2013 | Schwagerl ........... B23B 51/02 408/226 |
| 2013/0209189 A1 | 8/2013 | Borschert |
| 2013/0223943 A1 | 8/2013 | Gey |
| 2013/0259590 A1 | 10/2013 | Shaheen |
| 2013/0266389 A1 | 10/2013 | Hecht |
| 2014/0023449 A1 | 1/2014 | Jonsson |
| 2014/0255115 A1 | 9/2014 | Zabrosky |
| 2014/0255116 A1 | 9/2014 | Myers |
| 2014/0301799 A1 | 10/2014 | Schwaegerl |
| 2014/0321931 A1 | 10/2014 | Gey |
| 2014/0348602 A1 | 11/2014 | Schwaegerl |
| 2015/0063926 A1 | 3/2015 | Wu |
| 2015/0063931 A1 | 3/2015 | Wu |
| 2015/0104266 A1 | 4/2015 | Guter |
| 2015/0174671 A1 | 6/2015 | Maurer |
| 2015/0266107 A1 | 9/2015 | Gonen |
| 2015/0273597 A1 | 10/2015 | Aliaga |
| 2015/0298220 A1 | 10/2015 | Ach |
| 2015/0321267 A1 | 11/2015 | Takai |
| 2015/0328696 A1 | 11/2015 | Wang |
| 2016/0001379 A1 | 1/2016 | Kauper |
| 2016/0001381 A1 | 1/2016 | Lach |
| 2016/0016236 A1 | 1/2016 | Evans |
| 2016/0031016 A1 | 2/2016 | Takai |
| 2016/0059323 A1 | 3/2016 | Riester |
| 2016/0229017 A1 | 6/2016 | Guy |
| 2016/0207122 A1 | 7/2016 | Chen |
| 2016/0263663 A1 | 9/2016 | Schwaegerl |
| 2016/0263664 A1 | 9/2016 | Son |
| 2016/0263666 A1 | 9/2016 | Myers |
| 2016/0311035 A1 | 10/2016 | Peng |

FOREIGN PATENT DOCUMENTS

| | | |
|---|---|---|
| CN | 1204976 A | 1/1999 |
| CN | 1258240 A | 6/2000 |
| CN | 2438535 Y | 7/2001 |
| CN | 1616170 A | 5/2005 |
| CN | 1689740 A | 11/2005 |
| CN | 101048251 A | 10/2007 |
| CN | 100455390 C | 1/2009 |
| CN | 101605622 A | 12/2009 |
| CN | 101610866 A | 12/2009 |
| CN | 102006958 A | 4/2011 |
| CN | 102310214 A | 1/2012 |
| CN | I02307693 A | 1/2012 |
| CN | 104588739 A | 5/2015 |
| CN | 104759664 A | 7/2015 |
| CN | 204545517 | 8/2015 |
| CN | 204565232 | 8/2015 |
| CN | 106825693 A | 6/2017 |
| DE | 94340 | 9/1896 |
| DE | 384720 C | 11/1923 |
| DE | 524677 | 5/1931 |
| DE | 118806 | 9/1984 |
| DE | 3733298 C2 | 4/1992 |
| DE | 19605157 | 9/1996 |
| DE | 19543233 | 5/1997 |
| DE | 29809638 | 9/1998 |
| DE | 19945097 | 3/2001 |
| DE | 20204848 | 6/2002 |
| DE | 102004022747 A1 | 11/2005 |
| DE | 102007044095 A1 | 3/2009 |
| DE | 112009002001 T5 | 2/2013 |
| DE | 10 2012 200 690 A1 | 7/2013 |
| DE | 102012200690 | 7/2013 |
| DE | 102012212146 | 1/2014 |
| DE | 102013205889 | 5/2014 |
| DE | 102013209371 A1 | 11/2014 |
| DE | 102015106374 A1 | 10/2016 |
| EP | 118806 | 9/1984 |
| EP | 0599393 B1 | 2/1996 |
| EP | 1136161 | 9/2001 |
| EP | 813459 | 7/2003 |
| EP | 1476269 | 10/2009 |
| EP | 1996358 | 11/2011 |
| EP | 2524755 | 11/2012 |
| EP | 2551046 A1 | 1/2013 |
| FR | 907980 | 3/1946 |
| GB | 17961 | 0/1915 |
| GB | 1396855 | 5/1975 |
| JP | 5537209 | 3/1980 |
| JP | 11019812 A | 1/1999 |
| JP | 2002501441 A | 1/2002 |
| JP | 2002113606 A | 4/2002 |
| JP | 2003291044 A | 10/2003 |
| JP | 2004255533 A | 9/2004 |
| JP | 2005118940 | 5/2005 |
| JP | 2005169542 | 6/2005 |
| JP | 2006167871 A | 6/2006 |
| JP | 2008500195 A | 1/2008 |
| JP | 2011036977 A | 2/2011 |
| JP | 6211769 | 9/2017 |
| WO | 8403241 | 8/1984 |
| WO | 96/27469 A1 | 9/1996 |
| WO | 9853943 | 12/1998 |
| WO | WO03031104 A1 | 4/2003 |
| WO | WO2003031104 A1 | 4/2003 |
| WO | 2007/107294 A1 | 9/2007 |
| WO | 2007107294 | 9/2007 |
| WO | WO2008072840 A2 | 6/2008 |
| WO | WO2009128775 A1 | 10/2009 |

(56) References Cited

FOREIGN PATENT DOCUMENTS

WO  WO2010102793 A1  9/2010
WO  WO2015064904 A1  5/2015

OTHER PUBLICATIONS

Sep. 19, 2017 Final Office Action.
Mar. 10, 2017 Office action (3 months).
Mar. 21, 2017 Office action (3 months).
Apr. 6, 2017 First office action.
Mar. 22, 2017 First office action.
Apr. 6, 2017 Second Office Action.
Apr. 1, 2017 First office action.
Sep. 2, 2016 First office action.
Jul. 7, 2015 Office action (3 months).
Jul. 18, 2016 International Search Report Transmitted.
Nov. 3, 2015 Final Office Action.
Nov. 6, 2015 Final Office Action.
Dec. 8, 2015 Office action (3 months).
Feb. 23, 2016 Office action (3 months).
May 13, 2014 Office Action.
Mar. 23, 2016 First office action.
Apr. 8, 2016 Office action (2 months).
Apr. 12, 2016 Second Office Action.
Jun. 16, 2016 Office action (3 months).
Oct. 12, 2015 First office action.
Sep. 27, 2016 First office action.
Oct. 20, 2016 Office action (3 months).
Oct. 25, 2016 Office action (3 months).
Nov. 15, 2016 EPO Notification R161(1) & R.162.
Nov. 16, 2016 Second Office Action.
Dec. 30, 2016 Final Office Action.
Aug. 22, 2016 First office action.
Apr. 19, 2017 First office action.
May 9, 2017 Second Office Action.
Jun. 27, 2017 Office action (3 months).
Jul. 14, 2017 Office action (3 months).
May 25, 2017 Office action (3 months).
Oct. 22, 2015 Office action (3 months).
Mar. 7, 2016 Final Office Action.
Dec. 1, 2017 Second Office Action.
Dec. 29, 2017 Office action (3 months).
Jul. 29, 2016 Office action (3 months).
Nov. 23, 2016 Final Office Action.

\* cited by examiner

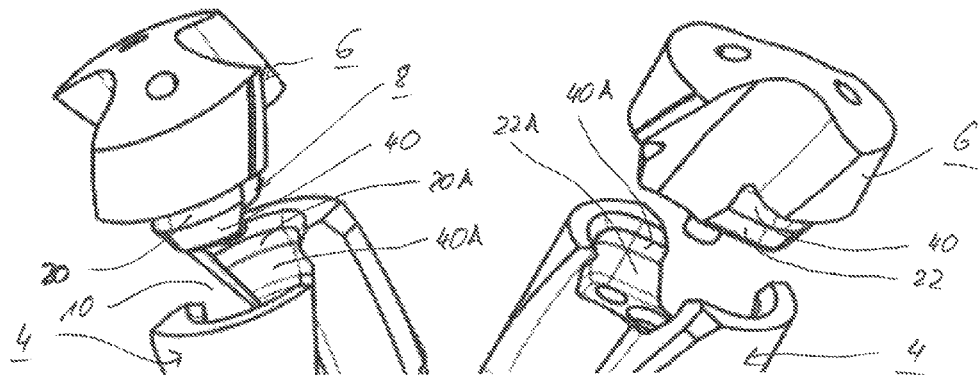
FIG 6A    FIG 6B
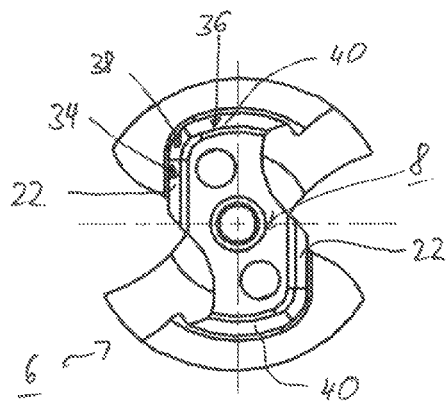    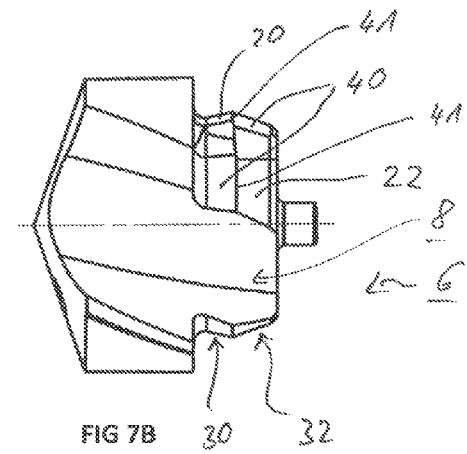
FIG 7A    FIG 7B
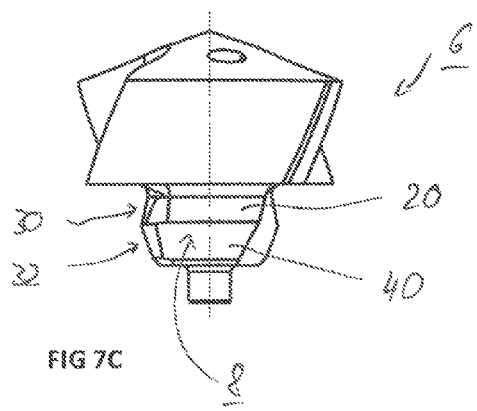
FIG 7C

TOOL HEAD FOR ROTARY CUTTING TOOL AND ROTARY CUTTING TOOL INCLUDING SAME

BACKGROUND

Field of the Invention

Embodiments of the present invention relate to tool heads for use in a rotary cutting tool and to rotary cutting tools including such tool heads.

Background Information

EP 0 813 459 B1 provides an example of a known rotary tool. Rotary tools of this type are modular tools, in which the cutting head is insertable in a reversibly interchangeable manner into a carrier. For this purpose, a coupling is required between the cutting head and carrier. A coupling generally has stop surfaces which serve to transmit a torque between the cutting head and the carrier. Furthermore, clamping or centering surfaces are provided as further functional surfaces, via which the cutting head is oriented in an axially parallel manner relative to the carrier.

In the case of the coupling which can be gathered from EP 0 813 459 B1, the cutting head has, at the rear end thereof oriented toward the carrier, a coupling pin which is received in a coupling receptacle of the carrier. The coupling pin merges here via a flat head support surface, with which the cutting head comes to rest on a flat end support surface of the carrier. The coupling pin here has the stop surfaces and the clamping or centering surfaces. The coupling pin is therefore wound around by flutes from the webs as far as possible recesses, and both functional surfaces, i.e. the stop surfaces and the clamping surfaces, are arranged in the interior and do not extend as far as an outer circumferential surface.

EP 1 996 358 B1 discloses a further coupling point with a wound-around coupling pin, but in which flutes do not interrupt the winding therearound.

In addition to this wound-around type, couplings are also known, in which the wound-around coupling pin merely bears the clamping surfaces, but, by contrast, the stop surfaces protrude in the radial direction, with a step being formed, and reach as far as the outer circumferential surface. A non-wound-around coupling of this type can be gathered, for example, from US 2011/0318128 A1 and from U.S. Pat. No. 6,059,492. Said documents also disclose a dovetail-shaped configuration of the clamping surfaces, and therefore said clamping surfaces form an engagement from behind in order to ensure axial pull-out protection.

The applicant's DE 10 2012 200 690.7, which has not yet been published at the filing date, describes a coupling of the wound-around type, in which the coupling pin, as viewed in cross section, has an approximately rectangular basic shape and is cut by flutes. The transverse sections of the coupling pin here form the clamping sections, whereas the longitudinal sections of the coupling pin form the stop surfaces. The coupling pin is at the same time of overall approximately dovetail-shaped design. The coupling point is in the form of a self-centering and self-clamping, reversibly interchangeable coupling. No additional fastening elements, such as screws or the like, are provided for securing the cutting head in the carrier.

The production of a coupling pin of this type is associated with a certain outlay because of the dovetail-shaped configuration of the coupling pin and the different functional zones. There is also an acute angle at the transition between coupling pin and the flat head support surface because of the dovetail-shaped configuration, and this results in high stress concentration forces, in particular in the region of the stop surfaces.

SUMMARY OF THE INVENTION

Starting therefrom, the present invention is based on the object of permitting an in particular self-clamping, reversibly releasable coupling between two coupling parts, in particular a cutting head of a drilling tool and a carrier corresponding thereto, which coupling is suitable for absorbing high forces and can be produced in a simple manner in terms of manufacturing.

As one aspect of the invention, a coupling part of a cutting head for a rotary tool for interchangeable fastening in a coupling receptacle of a carrier is provided. The coupling part here is generally designed in the manner of the wound-around type, i.e. has a coupling pin which is enclosed by an in particular flat head support surface. The coupling part is preferably a cutting head of a modular rotary tool, in particular a drilling tool. In the fitted state, the coupling pin engages in a coupling receptacle of a further coupling part, in particular a carrier of the modular rotary tool. The first coupling part is generally referred to below as cutting head and the further coupling part as carrier. In principle, the reverse configuration is also possible. The configuration of the coupling is not restricted here to the use for the connection between a cutting head and a carrier of a rotary tool.

The coupling pin has a plurality of types of functional surfaces, namely stop surfaces for transmitting a torque and clamping surfaces for centering the coupling part in the coupling receptacle. The coupling pin itself is divided here, as viewed in the axial or longitudinal direction, into two pin regions, namely an axially front pin region which is oriented toward the end side of the cutting head and a rear pin region which is oriented toward the carrier. The clamping surfaces and the stop surfaces are arranged here in different pin regions, i.e. in a manner offset axially with respect to one another.

This measure of decoupling the various functional surfaces in the longitudinal direction in the case of a standard, wound-around coupling pin permits individual adaptation of different pin regions at different axial heights to the respective requirements. This permits simpler production since, per pin region, the latter has to be of optimized design only for one particular functional surface. Furthermore, by means of the decoupling, the critical transition region between the head support surface and the coupling pin can also be configured more freely. In particular with axial pull-out protection by means of inclined surfaces which form an engagement from behind, the critical transition region to the head support surface is neutralized by the axial decoupling.

In general, said coupling is a self-centering coupling which is self-clamping in the axial direction and can be connected or else released again preferably without a tool. For this purpose, the cutting head is typically inserted in the axial direction into the coupling receptacle and subsequently brought by rotation into the end position.

For a reliable, self-clamping configuration, the clamping surfaces are expediently configured in a dovetail-shaped manner for axial pull-out protection. Further clamping or fastening elements, such as screws, etc., are preferably dispensed with.

The various types of functional surfaces, i.e. the clamping surfaces and the stop surfaces, are preferably arranged rotationally offset from one another in each case. In addition or alternatively, the functional surfaces of one type are arranged here in each case in pairs and opposite each other, in particular rotationally symmetrically by 180°.

The at least one pin region and in particular the entire coupling pin here expediently has a rectangular basic shape, as viewed in cross section. In this connection, a certain deviation from the strict rectangle shape is also permitted under rectangular basic shape, and the individual sections may thus have a curvature which is matched to the radius. A rectangular basic shape is also understood as meaning a variant in which an approximately rectangular basic surface has cutouts, for example as a consequence of flutes. Overall, the coupling pin therefore has a basic shape which can also be gathered from DE 10 2012 200 690.7. By means of this approximately rectangular basic shape of the coupling pin, good self-centering and self-clamping with simultaneously good transmission of torque is achieved.

At least one of the pin regions, preferably the two pin regions and therefore the entire coupling pin, have, in each case in pairs, mutually opposite longitudinal sections and mutually opposite transverse sections, which merge into one another in particular via rounded transition sections. The functional surfaces here are formed on the longitudinal sections and the transverse sections. The transverse sections and longitudinal sections are oriented here in particular at least approximately at right angles to one another.

The longitudinal sections and the transverse sections are expediently each interrupted by flutes, and therefore the transverse sections and longitudinal sections peter out in each case to form a respective flute. The flutes therefore cut out partial regions approximately in the diagonally opposite corner regions of the approximately rectangular basic surface.

Preferably, the longitudinal sections of the one pin region form the stop surfaces, and the transverse sections of the other pin region form the clamping surfaces. Overall, by means of this configuration, an approximately diagonally offset arrangement of the functional surfaces with respect to one another is formed. The functional surfaces are therefore spaced apart with respect to one another both in the circumferential direction (rotary direction and direction of rotation) and in the axial direction. By this means, in principle, a rectangular basic shape of the entire coupling pin can be formed and, at the same time, decoupling can be achieved. By means of the approximately rectangular basic shape of the entire coupling pin, the transverse section of the second pin region adjoins the transverse section of the first pin region in the axial direction, and the longitudinal section of the second pin region adjoins the longitudinal section of the first pin region in the axial direction, and therefore the longitudinal sections and transverse sections in the two pin regions are in each case formed at the same angle of rotation position and in this respect are aligned with one another.

In an expedient development, the longitudinal sections of the one pin region, in which the clamping surfaces are formed, and/or the transverse sections of the other pin region, in which the stop surfaces are formed, in each case form functionless free surfaces. A respective pin region therefore exclusively has one type of functional surfaces, namely either clamping surfaces or stop surfaces. The other surface in each case is inactive here and forms the free surface. It is understood by this that, in the inserted state of the cutting head in the carrier, said surfaces do not interact with a corresponding, complementary surface of the carrier, i.e. are spaced apart therefrom and form a clearance portion therewith. This ensures that the respective functional surface interacts in a defined manner with the complementary functional surface, which is assigned thereto, on the carrier and that over-determination does not occur.

The two pin regions preferably directly adjoin each other in the axial direction, that is to say the longitudinal and transverse sections are directly adjacent to one another. This permits an overall compact configuration.

In a preferred development, the respective sections of the adjoining pin regions are oriented here at an angle to each other, as viewed in a section plane parallel to the longitudinal direction, and are in each case separated from each other by an in particular horizontally extending separating line or a buckling line. A radius is customarily formed here in the region of the separating line. The separating line between the longitudinal sections has an axial offset with respect to the separating line between the transverse sections. The previously described functionless free surfaces are formed during production preferably by the respective surface being ground back, this resulting just in the offset of the separating line. The offset is therefore merely minor and caused by said grinding-back operation. The pin regions are therefore ground differently overall.

At least one of the sections and preferably both the transverse sections and the longitudinal sections of the two pin regions are arranged in each case in a roof-shaped manner with respect to one another. The sections here are oriented with respect to one another in particular at a roof angle within the range of approximately 130° to 160°. By means of the roof-shaped configuration, both the clamping surfaces and the stop surfaces are therefore preferably oriented at an angle to the longitudinal direction or axial direction—as viewed in a sectional view in the longitudinal direction. In the case of the clamping surfaces, said angular orientation brings about the engagement behind the axial pull-out protection (dovetail).

In principle, as an alternative to the roof angle, there is the possibility that merely the clamping surfaces are inclined relative to the longitudinal axis and the stop surfaces are oriented parallel to the longitudinal axis.

The configuration with the roof angle is a preferred variant embodiment. The two pin regions here are preferably arranged inclined asymmetrically with respect to the longitudinal axis, wherein, in particular, the stop surfaces are oriented at a greater inclination with respect to the longitudinal axis.

In principle, there is the possibility of forming either the clamping surfaces or the stop surfaces in the front pin region. In the case of a configuration with the stop surfaces in the rear pin region, the stop surfaces are decoupled from the head support surface, and therefore there is no direct connection to the head support surface in the region of the greatest torque forces. At the same time, however, the dovetail-like configuration of the clamping surfaces continues to form an acute angle to the head support surface. By this means, a certain stress concentration is maintained even when no excessively high forces (torques) are transmitted at this point of the clamping surfaces.

In a preferred configuration, however, the stop surfaces are arranged on the front pin region and the clamping surfaces are arranged on the rear pin region. In addition to the roof-shaped orientation, this results in an obtuse transition angle between the coupling pin and the head support surface, and therefore stress concentration forces scarcely occur in this critical transition region.

In general, provision is therefore basically made for the functional surfaces adjacent to the head support surface to form an obtuse angle therewith, said obtuse angle preferably being greater than 100°, in particular greater than 110° or else 120° up to a maximum of approximately 130°.

As an alternative to the basic configuration, in which the respective sections of the pin regions in each case directly adjoin one another in the axial direction, according to an alternative preferred embodiment, a step-like transition between the two pin regions is formed in the region of the stop surfaces. This therefore means that the stop surface of the one pin region does not merge directly into the corresponding longitudinal section of the other pin region. On the contrary, an in particular horizontally extending step is formed here.

At the same time, the clamping surface expediently extends in the circumferential direction over the entire pin region. By means of this configuration, in particular in combination with the step, the particular advantage is therefore achieved that, for reliable clamping of the cutting head in the carrier, the clamping surface is wound around to the greatest possible extent. The clamping surface here is typically oriented at least substantially concentrically with respect to the circumferential surface of the cutting head or of the carrier and is therefore suitable only to a limited extent for the transmission of torque forces. By means of the formation of the step in the region of the stop surfaces, there is therefore the advantageous possibility of allowing the stop surface to buckle away from the circumferential direction, and therefore the stop surface is oriented at an angle, preferably a right angle, to the circumferential direction in order to achieve as effective a transmission of torque as possible.

As another aspect of the present invention, a rotary tool, such a s a drilling tool, is provided. The advantages and preferred embodiments cited in respect of the coupling part, in particular cutting head, can expediently be transferred to the rotary tool. The latter is generally formed by the cutting head and a carrier, into which the cutting head is insertable in a reversibly interchangeable manner. The carrier here has a coupling receptacle which has functional surfaces which are complementary to the coupling pin of the cutting head.

Complementary functional surfaces are understood here as meaning surfaces which, in respect of the geometric configuration thereof, interact with the respective functional surfaces of the coupling pin in order to transmit forces and lie two-dimensionally against each other. Complementary free surfaces are formed merely with respect to the free surfaces of the coupling pin, said complementary free surfaces, in the assembled state, being spaced apart from the free surfaces, with the formation of a clearance portion, and are arranged merely opposite one another, but do not interact with the effect of transmitting forces.

For reliable clamping of the cutting head, the clamping surfaces of the coupling pin are expediently optionally formed somewhat by an excess dimension and have an eccentricity or else an elliptical configuration, and therefore, as the cutting head increasingly rotates in the coupling receptacle, the clamping force increases.

BRIEF DESCRIPTION OF THE ACCOMPANYING FIGURES

Figure 1B:
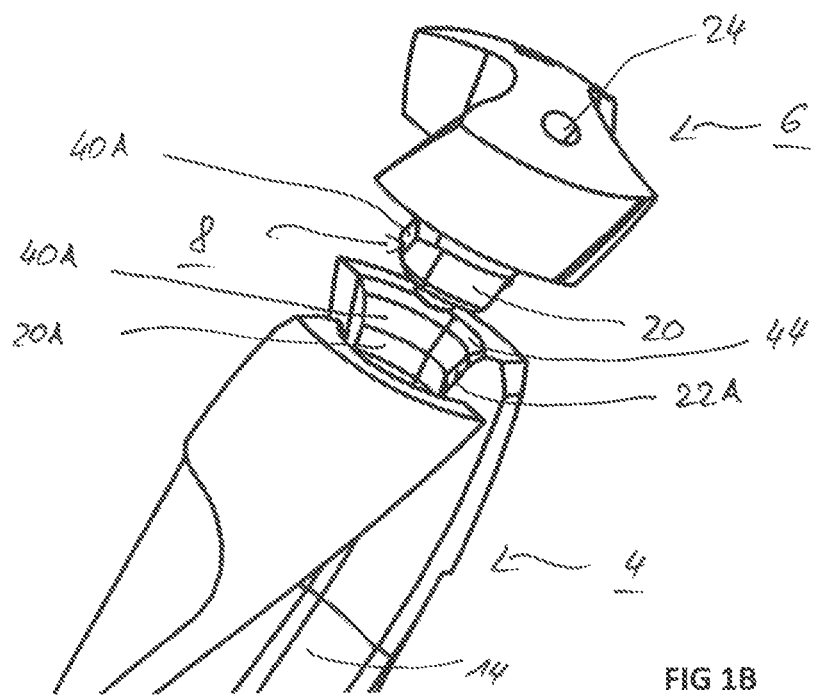
Figure 2A:
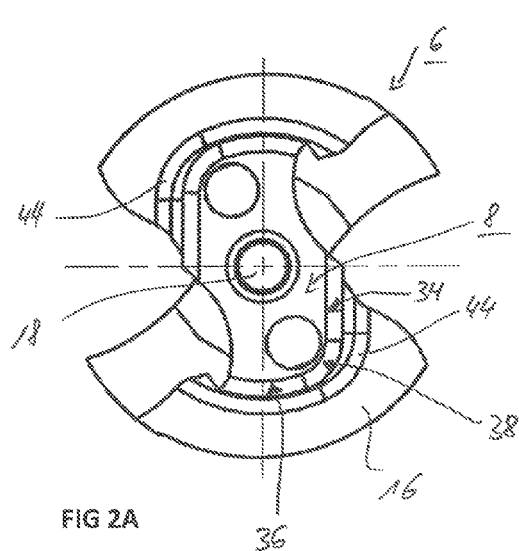
Figure 2B:
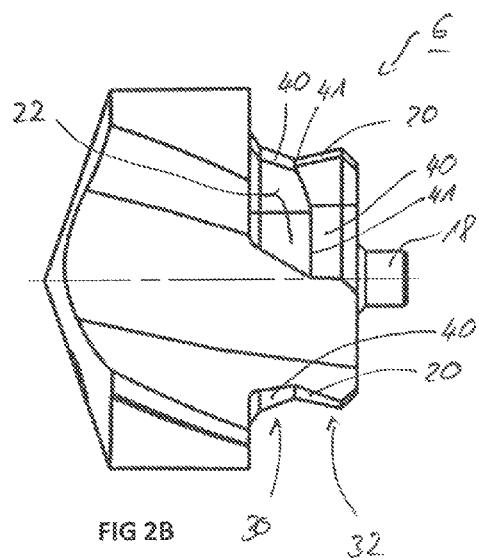
Figure 2C:
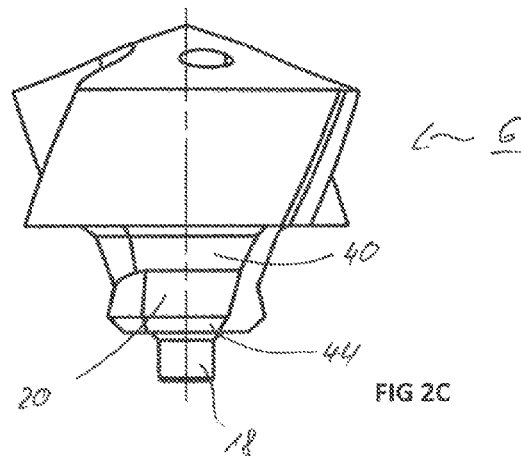
Figure 3:
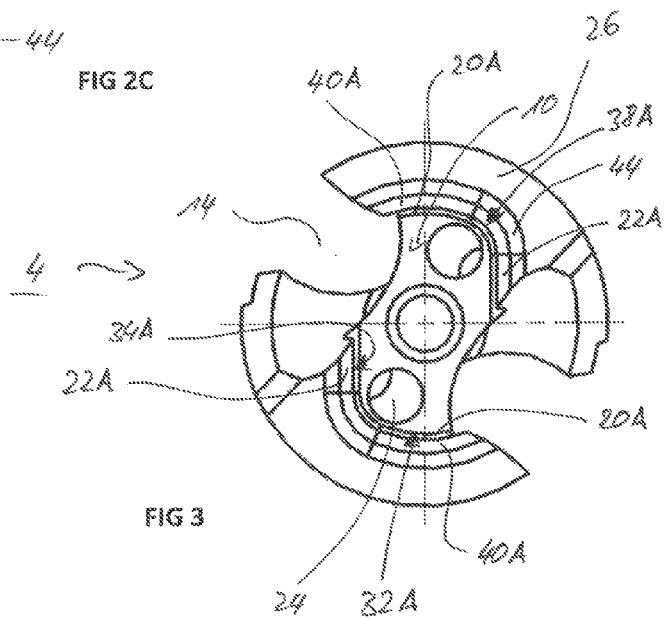
Figures 4A, 4B:
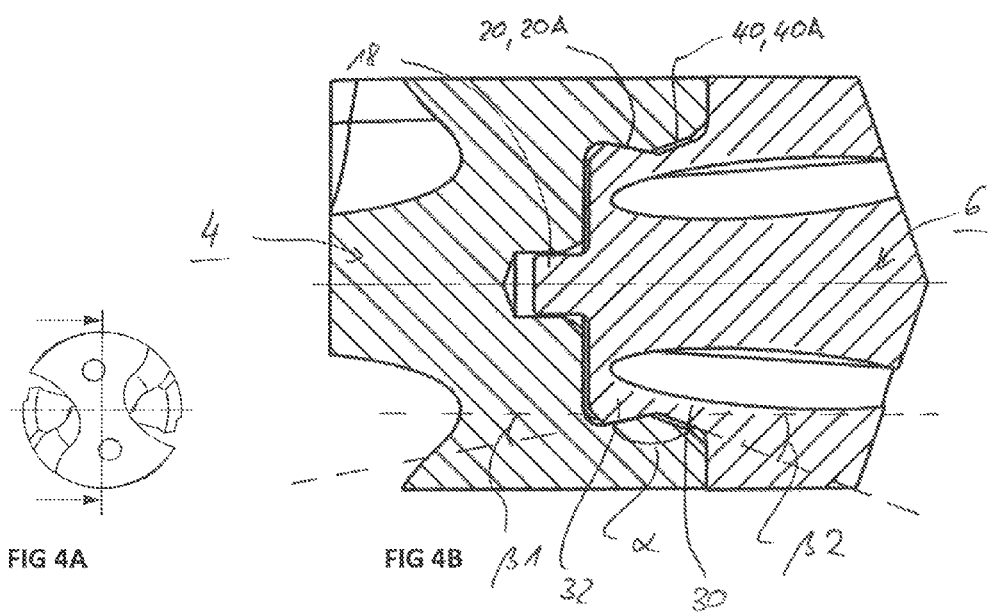
Figures 5A, 5B:
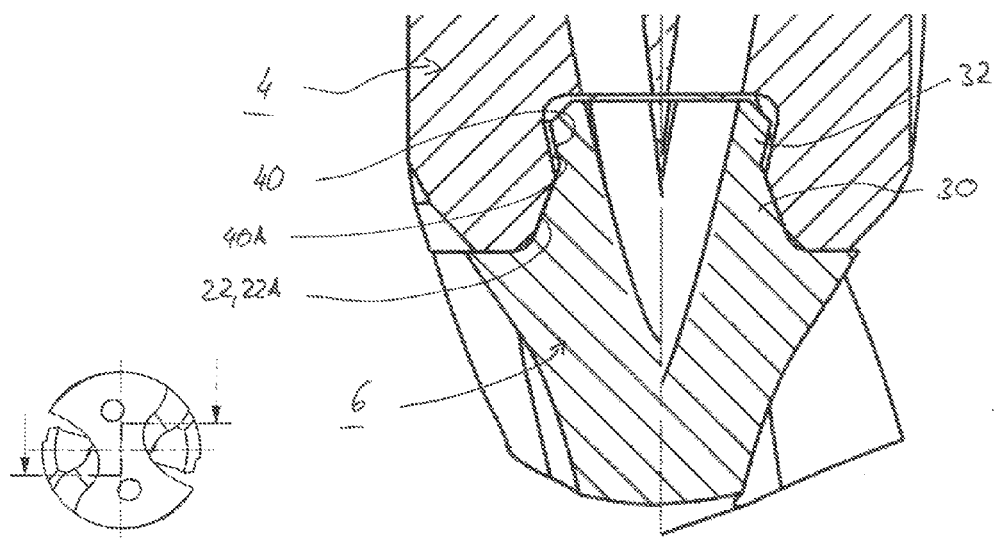
Figure 8:
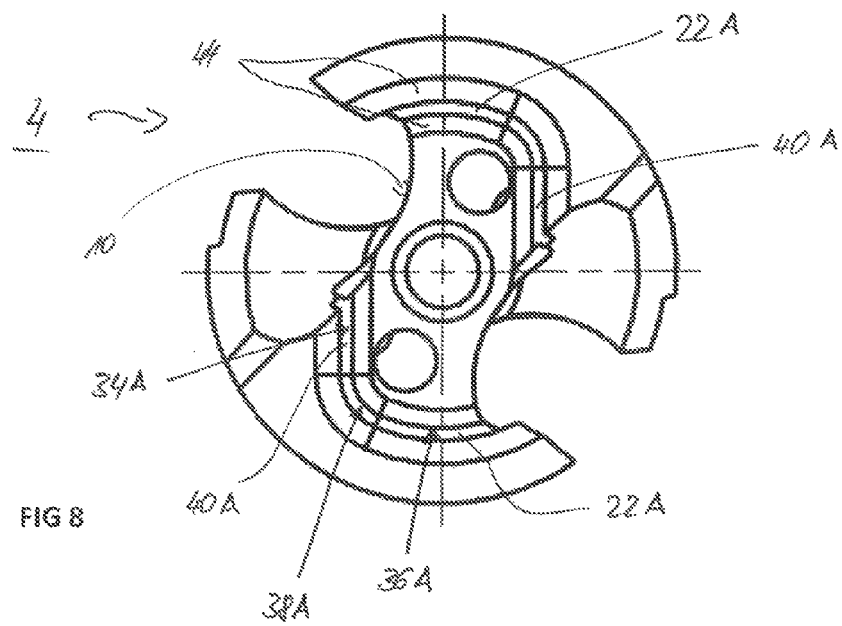
Figures 9A, 9C:
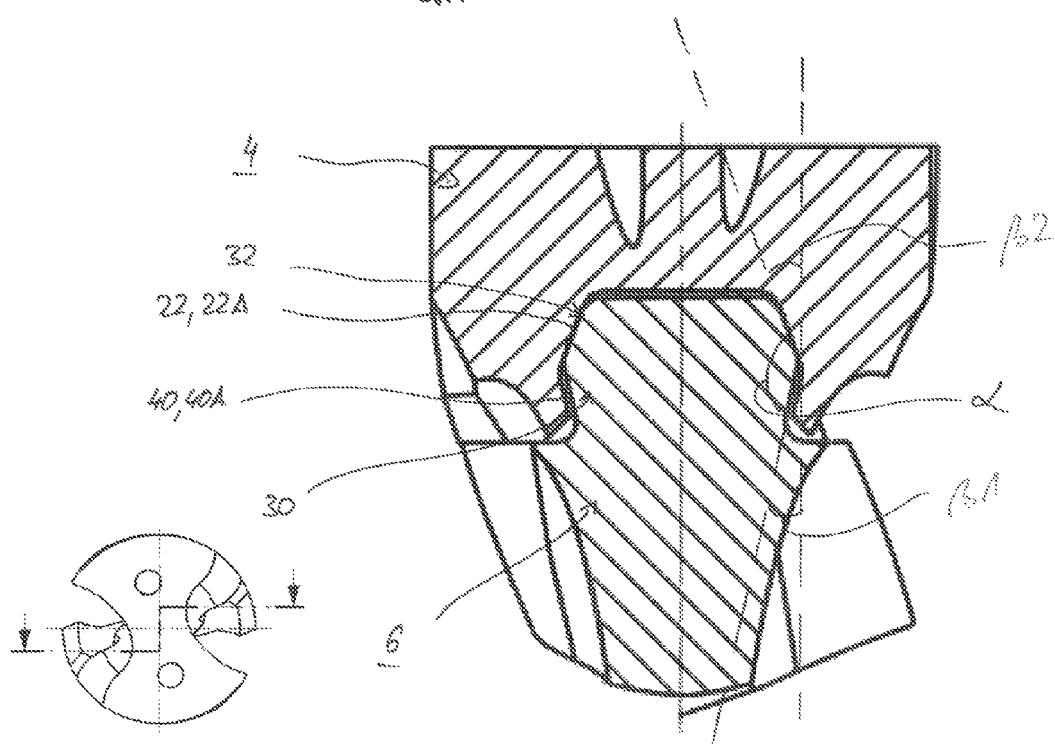
Figures 10A, 10B:
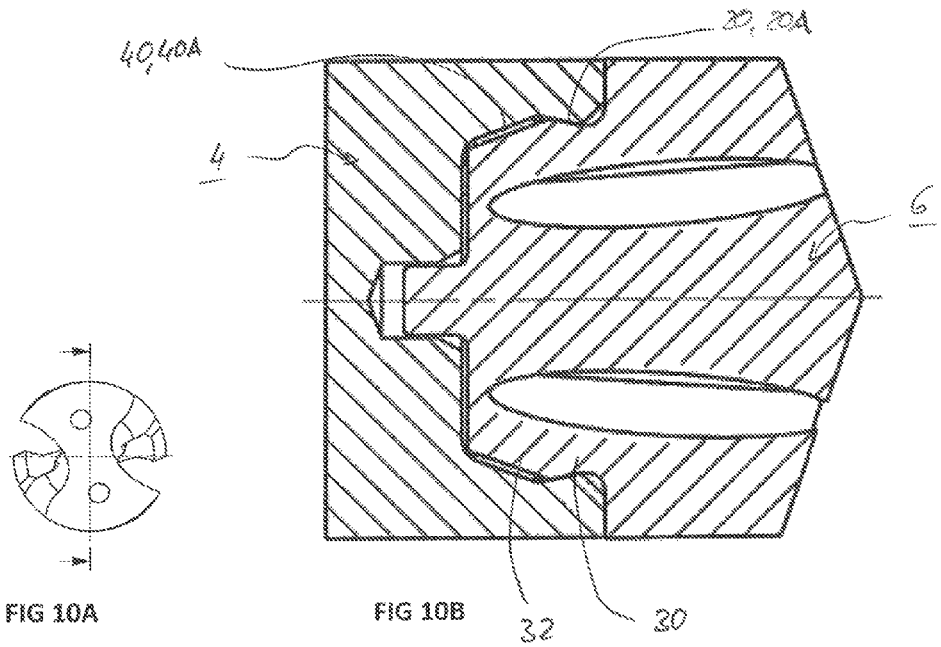
Figures 11A, 11B:
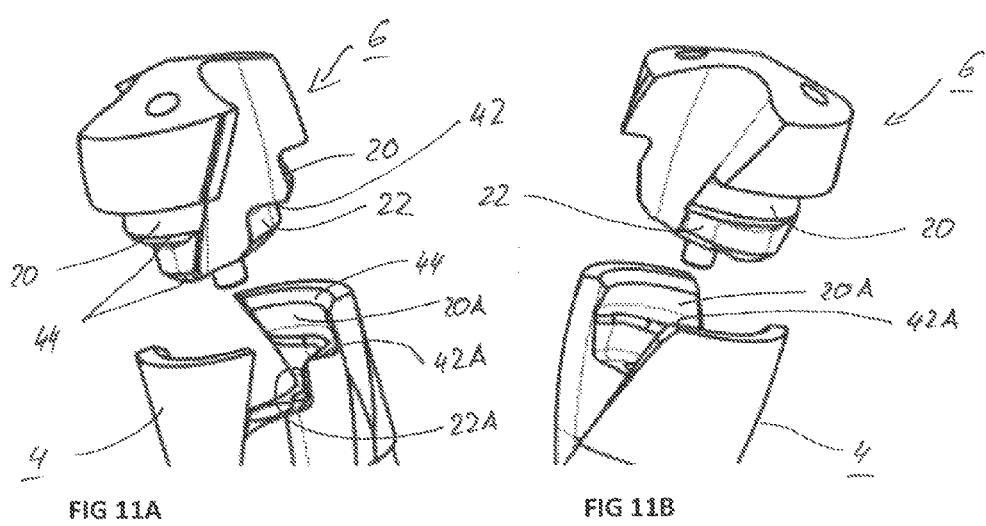
Figure 12A:
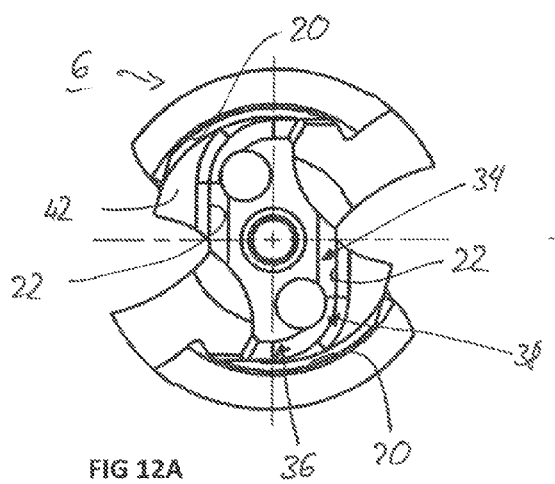
Figure 12B:
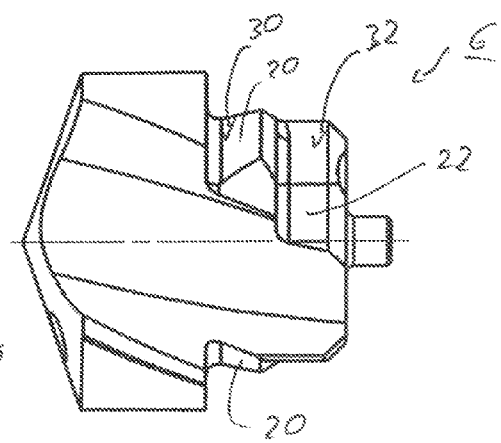
Figure 12C:
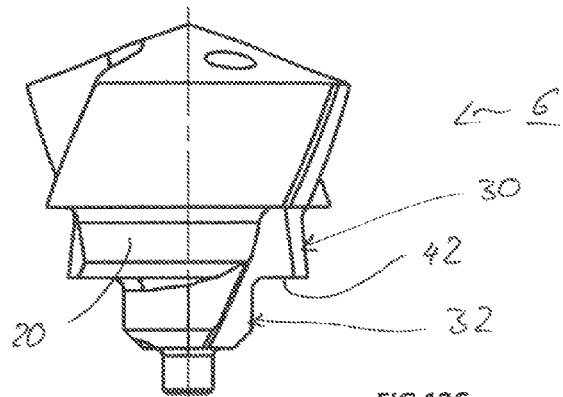
Figure 13:
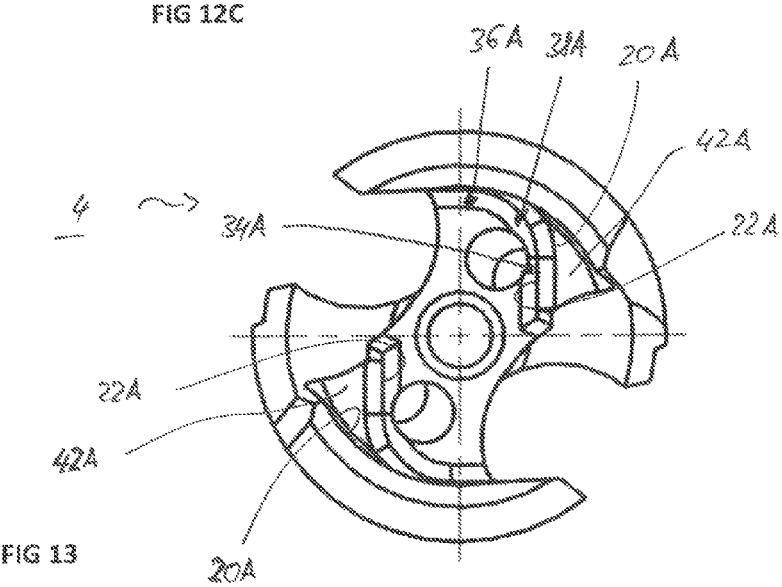
Figures 14A, 14B:
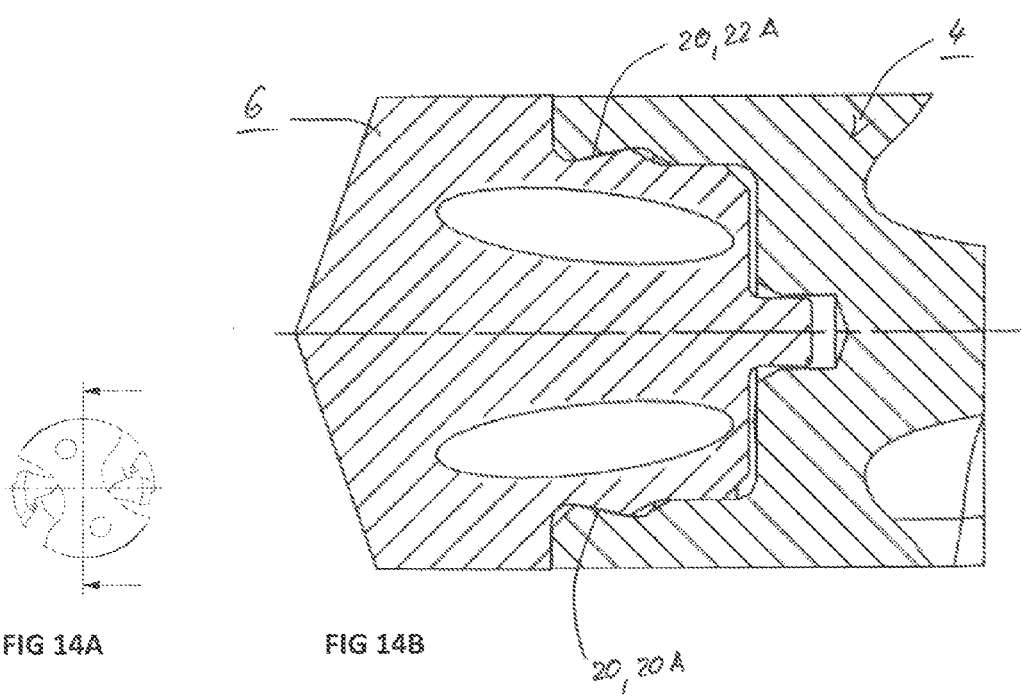

Novel features and characteristics of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

FIGS. 1A, 1B show partial perspective exploded illustrations of a drilling tool with a cutting head and a carrier of a first variant embodiment, FIGS. 2A-2C show a horizontal projection from below of the cutting head and also two side views of the first variant embodiment, FIG. 3 shows a horizontal projection of the carrier and of the coupling receptacle according to the carrier in FIGS. 1A and 1B, FIG. 4A shows an end view of the drilling tool according to FIGS. 1A, 1B, FIG. 4B shows a sectional view according to the section line in FIG. 4A, FIG. 5A shows a further end view of the first variant embodiment, FIG. 5B shows the sectional view according to the section line in FIG. 5A, FIGS. 6A, B show partial perspective exploded illustrations of a drilling tool according to a second variant embodiment, FIGS. 7A-C show a horizontal projection from below of the cutting head and also two side views according to the second variant embodiment, FIG. 8 shows a horizontal projection of the carrier and of the coupling receptacle according to the second variant embodiment, FIG. 9A shows an end view of the second variant embodiment, FIG. 9C shows a sectional view according to the section line in FIG. 9A, FIG. 10A shows a further end view of the second variant embodiment, FIG. 10B shows a sectional view according to the section line in FIG. 10A, FIGS. 11A, B show partial perspective exploded illustrations of a drilling tool according to a third variant embodiment, FIGS. 12A-C show a horizontal projection from below and also two side views of the cutting head according to the third variant embodiment, FIG. 13 shows a horizontal projection of the carrier and of the coupling receptacle of the third variant embodiment, FIG. 14A shows an end view of the third variant embodiment, FIG. 14B shows a sectional view along the section line according to FIG. 14A.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the disclosure.

The drilling tool according to all three variant embodiments is designed as a modular drilling tool with a carrier 4 and a cutting head 6 which is fastenable in a reversibly interchangeable manner in said carrier. The coupling between carrier 4 and cutting head 6 takes place here with the aid of what is referred to as the wound-around type. For this purpose, the cutting head 6 has, at the rear end thereof, a coupling pin 8 which extends in the axial or longitudinal direction and is insertable into a coupling receptacle 10 of the carrier 4. The coupling receptacle 10 is formed here in both sides by two edge webs 12 extending in the axial direction, as a continuation of a respective back of the drill. Said edge webs are interrupted by flutes 14. The edge webs 12 completely enclose the coupling pin 8 apart from the interruption by the flutes 14.

The flutes 14 are also continued in the cutting head 6 and here cut a partial section out of the coupling pin 8. The coupling pin 8 is enclosed in a flat head support surface 16 which extends in a horizontal plane and is interrupted only by the flutes 14. The coupling pin 8 is also adjoined in the direction of the carrier 4 by an insertion pin 18 which is formed centrally and concentrically with respect to a center axis which is at the same time the longitudinal axis. Preferably, no clamping whatsoever and also no centering take place at the insertion pin. Said functions are carried out exclusively via the functional surfaces (which are explained below) of the coupling pin 8, namely clamping surfaces 20. As further functional surfaces, the coupling pin 8 has stop surfaces 22 for transmitting torque. In the exemplary embodiment, the drilling tool furthermore has coolant channels 24 which emerge at the base of the coupling receptacle 10 and are then continued in the coupling pin 8 to the front end side of the cutting head 6 and emerge there.

In the fitted state, the cutting head 6 rests flat with the head support surface 16 thereof on the end support surfaces 26 of the edge webs 12.

The cutting head 6 is installed generally by axial insertion of the cutting head 6 at a rotational position which is rotated in comparison to the fastened end position. The cutting head is subsequently rotated such that the corresponding functional surfaces come mutually into engagement with the complementary functional surfaces of the coupling receptacle 10 in order to ensure the desired self-centering, self-clamping and entraining of torque.

As can be gathered in particular from the respective side views of the cutting heads 6 and from the sectional illustrations, the coupling pin 8 itself is divided into a front pin region 30 and a rear pin region 32 which preferably directly adjoin each other in the axial direction. As can be gathered in particular from the horizontal projections of the cutting head 6 and of the carrier, the coupling pin 8 and the coupling receptacle 10, which is formed in a complementary manner with respect thereto, has an approximately rectangular basic shape, and therefore the coupling pin 8 has longitudinal sections 34 and transverse sections 36, which merge into one another in each case via transition sections 38 which are designed as rounded corner sections.

In the first two variant embodiments, the entire coupling pin 8 and therefore both the front pin region 30 and the rear pin region 32 are formed with the substantially rectangular basic shape. The transverse sections 36 of the pin regions 30, 32 axially adjoining each other are aligned with one another and therefore cover the same angle of rotation region. The same is true of the longitudinal sections 34. It is then of particular importance for each of the pin regions 30, 32 to have either exclusively clamping surfaces 20 or exclusively stop surfaces 22. In the first two variant embodiments, the two functional surfaces are each arranged offset with respect to each other in the circumferential direction, and therefore the functional surfaces as a whole are each arranged approximately diagonally to each other.

In general, the stop surfaces 22 here are formed on the longitudinal sections 34 and the clamping surfaces 20 are formed on the transverse sections 36.

In all of the variant embodiments, the clamping surfaces 20 are designed as surfaces which are inclined obliquely in the manner of a dovetail, in order to form an engagement behind.

Within the context of a simple production method, the surfaces, in particular the clamping surfaces 20, are formed along a circular path, which can be produced particularly simply in terms of grinding.

Owing to the undercuts formed by the dovetail-like configuration, the individual functional surfaces 20, 22 are frequently not to be seen or scarcely seen in the horizontal projection illustrations of the carrier 4 (FIG. 3, FIG. 8, FIG. 13). The surfaces of the coupling receptacle 10 which are complementary to the surfaces of the coupling pin 8 are generally provided with the same reference numbers, supplemented by the letter A. The clamping surfaces of the coupling receptacle 10 which are complementary to the clamping surfaces 20 of the coupling pin 8 therefore bear the reference number 20A, the complementary stop surfaces 22A, etc.

In the first two variant embodiments, free surfaces 40 in each case adjoin the respective functional surfaces 20, 22 in the axial direction, said free surfaces being functionless insofar as they do not contribute either to the transmission of torque or to the centering or clamping. The free surfaces 40 are therefore likewise arranged diagonally opposite in each case. Both between the free surfaces 40 and between the functional surfaces 20, 22, surface sections are in each case formed in the circumferential direction by the transition sections 38.

The free surfaces 40 are formed in particular by a separate grinding-back operation. By this means, a buckling line or separating line 41 is displaced, and therefore a respective separating lines 41 between the front and rear pin regions 30, 32 in the region of the longitudinal sections 34 and of the transverse sections 36 are arranged offset with respect to one another in the axial direction. The separating lines 41 extend here in the horizontal direction in each case (cf. in this respect in particular FIGS. 2B and 7B).

As can also be gathered in particular from the cross-sectional illustrations in the case of the first two variants, the free surfaces 40 are spaced apart from complementary free surfaces 40a on the coupling receptacle 10, and therefore have a clearance portion. In all of the variant embodiments, the individual surfaces merge into one another, as viewed in the axial direction, in each case via rounded portions or bevels 44. In addition, a bevel 44 designed as a clearance is also formed in each case on the end side of the coupling pin 8 and on the end side of the carrier 6.

As is in particular revealed in the respective cross-sectional illustrations, the respective pin regions 30, 32 are arranged in a roof-shaped manner with respect to each other and enclose a roof angle α in the region of approximately 150° therebetween (cf. FIGS. 4B and 9C). Since the clamping surfaces 20 are in each case of dovetail-like design, said clamping surfaces each have an angle of inclination β1 with respect to the longitudinal axis in order to form an undercut. On account of the roof-like configuration, the buckling angle between the two pin regions 30, 32 is firstly designed in the manner of a constriction on the coupling pin 8 (variant embodiment 1, FIGS. 2B, 4B, 5B) and in the manner of a curvature in the case of the second variant embodiment (FIGS. 7B, 9C, 10B).

The substantial difference between the two first variant embodiments can be seen in the arrangement of the functional surfaces 20, 22. According to the first variant embodiment illustrated in FIGS. 1 to 5, the stop surfaces 22 are formed on the front pin region 30 and the clamping surfaces 20 are formed on the rear pin region 32. Conversely, in the case of the second variant embodiment according to FIGS. 6 to 10, the clamping surfaces 20 are formed on the front pin region 30 and the stop surfaces 22 are formed on the rear pin region 32.

The clamping surfaces 20 are oriented at the angle of inclination β1 with respect to the longitudinal axis and the stop surfaces 22 are oriented at an angle of inclination β2. Here, β1 is customarily smaller than the angle β2, and therefore a certain asymmetry arises. In particular, β1 is approximately 10° and β2 is approximately 20°, i.e. approximately twice as large.

With the arrangement of the stop surfaces 22 in the front pin region 30 with the angle of inclination β2, the overall result is an obtuse transition angle to the head support surface 16, said transition angle lying approximately in the region of 110° (cf. in this respect, for example, FIG. 4B).

The third variant embodiment (FIGS. 11-14) differs from the two preceding embodiments in that only one of the two pin regions 30, 32, in the exemplary embodiment the rear pin region 32, has a substantially rectangular basic shape. On said pin region 32, the stop surfaces 22 are again formed on the corresponding longitudinal sections 34. By contrast, on the other pin region, i.e., in the exemplary embodiment, on the front pin region 30, a continuous clamping surface 20 is formed in the manner of a dovetail, said clamping surface extending at least approximately concentrically with respect to the circumferential line of the cutting head 6 and therefore of the back of the drill, as can be gathered in particular also from FIGS. 11 and 12. This different geometry of the two pin regions 30, 32 correspondingly also produces a step-like transition from the first front pin region 30 to the rear pin region 32 in the region of the stop surface 22. At this point, the coupling pin 8 therefore has an in particular horizontally extending step 42. The basic shape of the front pin region 30 is approximately circular (with the recesses caused by the flutes 14) or slightly elliptical. By means of this measure, the edge webs 12 wind around in the region of the clamping surfaces 22 to a particularly large extent, and therefore reliable self-clamping is achieved.

The invention claimed is:

1. A coupling part of a cutting head for a rotary tool for interchangeable fastening in a coupling receptacle of a carrier, the coupling part comprising:
   a coupling pin having a plurality of types of functional surfaces, the types of functional surfaces including stop surfaces structured to transmit a torque between the coupling receptacle and the coupling part, and clamping surfaces structured to center and clamp the coupling part in the coupling receptacle, the stop surfaces being of sufficient axial dimension for transmitting torque from the coupling receptacle during operation of the rotary tool;
   wherein, with respect to a central axis of rotation, the coupling pin includes an axially front pin region and an adjoining, axially rear pin region, and the clamping surfaces and the stop surfaces are arranged in different pin regions;
   wherein, when viewed in a horizontal projection perpendicular to the axis of rotation:
      the coupling pin has mutually opposite longitudinal sections, mutually opposite transverse sections, and transition sections;
      the longitudinal sections and the transverse sections being disposed radially inwardly with respect to an outer circumference of the cutting head;
      wherein, with respect to a rotational direction of the coupling pin, each one of the longitudinal sections merges into one of the transverse sections via one of the transition sections;
      the longitudinal sections and the transverse sections are each interrupted by flutes; and
      with respect to a rotational direction of the coupling pin, the longitudinal sections are oriented at a non-zero angle with respect to the transverse sections; and
   wherein the functional surfaces are formed on the longitudinal sections and the transverse sections.

2. The coupling part as recited in claim 1, wherein the clamping surfaces, when viewed in axial cross-section, exhibit a dovetail-shaped configuration for axial pull-out protection.

3. The coupling part as recited in claim 1, wherein, when viewed in a horizontal projection perpendicular to the axis of rotation, and with respect to a rotational direction of the coupling pin:
   the different types of functional surfaces are arranged to be offset and non-overlapping with respect to one another; and
   the functional surfaces of one type are arranged in pairs and opposite each other.

4. The coupling part as recited in claim 1, wherein the coupling pin of at least one of the pin regions has a rectangular basic shape, as viewed in the horizontal projection perpendicular to the axis of rotation.

5. The coupling part as recited in claim 1, wherein each of the longitudinal sections and each of the transverse sections:
   extends from a corresponding one of the transition sections; and
   terminates at a corresponding one of the flutes.

6. The coupling part as recited in claim 1, wherein the longitudinal sections of the one pin region form the stop surfaces, and the transverse sections of the other pin region form the clamping surfaces.

7. The coupling part as recited in claim 1, wherein one or both of:
   the longitudinal section of the pin region in each case forms a functionless free surface with the clamping surfaces, and
   the transverse section of the pin region in each case forms a functionless free surface with the stop surfaces.

8. The coupling part as recited in claim 1, wherein:
the transverse sections are in each case directly adjacent to the longitudinal sections in the axial direction;
the transverse sections are in each case separated by a separating line;
the longitudinal sections are in each case separated by a separating line; and
the separating line between the longitudinal sections is axially offset with respect to the separating line between the transverse sections.

9. The coupling part as recited in claim 1, wherein the transverse sections and the longitudinal sections of the two pin regions are arranged in each case in a roof-shaped manner with respect to one another with a roof angle within the range of approximately 130° to 160°.

10. The coupling part as recited in claim 1, wherein the stop surfaces are arranged in the front pin region, and the clamping surfaces are arranged in the rear pin region.

11. The coupling part as recited in claim 1, wherein the two pin regions merge into each other in the region of the stop surfaces, with a step being formed.

12. The coupling part as recited in claim 11, wherein the clamping surfaces, interrupted by flutes, extend in a circumferential direction over the entire pin region.

13. A rotary tool comprising:
a carrier; and
a cutting head having a coupling part as recited in claim 1, the cutting head being fastened interchangeably on an end side of the carrier,
wherein the carrier includes a coupling receptacle which is designed for receiving the coupling pin of the cutting head and has complementary functional surfaces.

14. The rotary tool as recited in claim 13, wherein the coupling receptacle has free surfaces which are complementary to the free surfaces of the coupling pin, and the free surfaces of the coupling receptacle and those of the coupling pin are spaced apart from one another.

15. The rotary tool as recited in claim 1, wherein the transverse sections and the longitudinal sections are oriented at approximately right angles to one another.

16. The rotary tool as recited in claim 1, wherein the transverse sections are disposed in a different pin region than the longitudinal sections.

17. A coupling part of a cutting head for a rotary tool for interchangeable fastening in a coupling receptacle of a carrier, the coupling part comprising:
a coupling pin having a plurality of types of functional surfaces, the types of functional surfaces including stop surfaces structured to transmit a torque between the coupling receptacle and the coupling part, and clamping surfaces structured to center and clamp the coupling part in the coupling receptacle, the stop surfaces being of sufficient axial dimension for transmitting torque from the coupling receptacle during operation of the rotary tool;
wherein, with respect to a central axis of rotation, the coupling pin includes an axially front pin region and an adjoining, axially rear pin region, and the clamping surfaces and the stop surfaces are arranged in different pin regions;
wherein, when viewed in a horizontal projection perpendicular to the axis of rotation:
at least one of the pin regions of the coupling pin has mutually opposite longitudinal sections, mutually opposite transverse sections, and transition sections;
the longitudinal sections and the transverse sections being disposed radially inwardly with respect to an outer circumference of the cutting head;
wherein, with respect to a rotational direction of the coupling pin, each one of the longitudinal sections merges into one of the transverse sections via one of the transition sections; and
with respect to a rotational direction of the coupling pin, the longitudinal sections are oriented at approximately right angles to the transverse sections; and
wherein the functional surfaces are formed on the longitudinal sections and the transverse sections.

18. The coupling part as recited in claim 17, wherein:
the transverse sections are in each case axially adjacent to the longitudinal sections in the axial direction; and
the transverse sections are axially offset with respect to the longitudinal sections.

19. The coupling part as recited in claim 17, wherein the longitudinal sections and the transverse sections are each interrupted by flutes.

20. The coupling part as recited in claim 1, comprising a head support surface which, when viewed in a horizontal projection perpendicular to the axis of rotation:
surrounds the longitudinal sections and the transverse sections; and
is interrupted by the flutes.

21. The coupling part as recited in claim 1, wherein the coupling part is self-centering and self-clamping upon:
insertion of the cutting head axially into a coupling receptacle of a carrier; and
rotation of the cutting head, with respect to the coupling receptacle, into an end position.

* * * * *